United States Patent [19]

Heidman, Jr.

[11] Patent Number: 4,575,706
[45] Date of Patent: Mar. 11, 1986

[54] COMBINED MAGNETIC AND THERMAL RELAY AND CIRCUITS FOR TIMED ALARMS AND LAMPS OF VEHICLES

[76] Inventor: William A. Heidman, Jr., 4604 Robbins, San Diego, Calif. 92122

[21] Appl. No.: 581,117

[22] Filed: Feb. 17, 1984

[51] Int. Cl.$^4$ .................. B60R 25/00; G08B 21/00
[52] U.S. Cl. ........................ 340/63; 340/641; 340/643; 340/57; 337/332; 337/298; 337/5; 335/31; 335/43; 307/10 AT
[58] Field of Search .................... 340/63-65, 340/641-644, 640, 655, 57, 52 D, 52 R; 337/332, 333, 3, 5, 376, 298; 335/31-33, 43; 307/10 AT; 180/173, 287

[56] References Cited

U.S. PATENT DOCUMENTS

| | | | |
|---|---|---|---|
| 3,508,237 | 4/1970 | Kimmelman | 340/643 |
| 3,925,757 | 12/1975 | Kimmelman | 340/643 |
| 4,480,249 | 10/1984 | Heidman, Jr. | 340/63 |

Primary Examiner—Donnie L. Crosland
Attorney, Agent, or Firm—Frank D. Gilliam

[57] ABSTRACT

A combined magnetic and thermal activated relay for use in alarm systems. The relay includes a thermal activated bimetal switch in series with the current through the magnetic coil which activates a magnetic switch. The thermal switch is in a normally closed state and the magnetic switch is in a normally open state. When current passes through the coil the magnetic switch changes from its normally open to a closed state applying voltage potential for an external requirement. The heat generated by the coil's resistance to current flow heats the core of the magnetic coil, and after reaching an elevated temperature level the thermal activated switch changes from its normally closed state to an open state opening the current flow path through the magnetic coil causing the magnetic switch to return to its normal open state removing voltage for the external requirement. The switching operation of the thermal switch cycles with temperature changes. The time between cycles can be selected by coil varying the size of the core, size of the coil wire, the number of turns of the coil wire or the type of metal used in the bimetal rotor.

16 Claims, 7 Drawing Figures

COMBINED MAGNETIC AND THERMAL RELAY AND CIRCUITS FOR TIMED ALARMS AND LAMPS OF VEHICLES

BACKGROUND OF THE INVENTION

The invention is directed to alarm system activation relays and more particularly to relays that activate alarm systems for a pre-determined length of time.

In the prior art, the time span for alarm activation is done by the utilization of electronic, mechanical or thermal timers which are solid state and are separate and distinct from the actual means used to activate the alarm system. These timer units are placed in series between the source of electrical current used to operate the alarm system and the alarm activating device.

In my prior U.S. Pat. Nos. 2,766,343; 3,263,211; 3,372,373; 3,372,374 and 4,354,174, I have disclosed alarm circuits which when activated operate flashing hazard light and horn circuits which may be readily adaptable to be incorporated with my present invention for enhancement thereof.

It would be highly advantageous to utilize the activating means of the alarm system to satisfy the timing requirement for alarm activation without the use of expensive add on timers.

SUMMARY OF THE INVENTION

The invention is directed to a unique combined magnetic and thermal switching relay which can be used as the timer and activating means of an alarm system. The conventional activating relay of the device is replaced with a magnetic activating relay combined with a thermal timing device which is activated primarily by the heat of the magnetic core of the activating relay adjacent thereto.

An object of this invention is to provide a combined magnetic and thermal activated relay.

Another object of this invention is to construct a combined magnetic and thermal activated relay with a selected thermal switch activation time cycle.

Another object of this invention is to provide a timer which is operated primarily by the heat generated by the coil of an associated magnetic relay.

Still another object of the invention is to provide an arming or alarm system activation switch lock, which is combined either with the ignition lock or door lock that must be pushed inwardly and rotated to anti-theft position thereafter removing key.

These and other objects of the invention will become apparent from the following description taken together with the accompanying drawings.

DETAILED DESCRIPTION OF THE DRAWINGS

Figure 1:
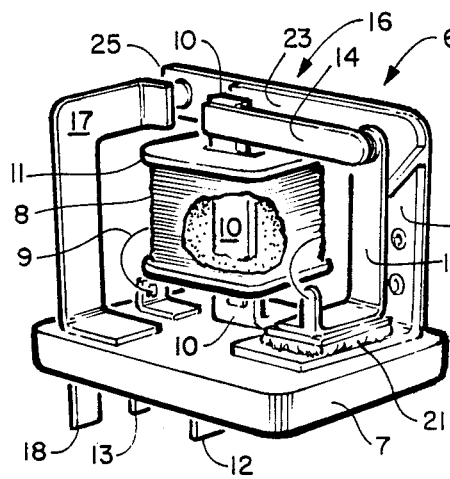
FIG. 1 is a perspective view of the combined magnetic/thermal relay of the invention.
Figure 2:
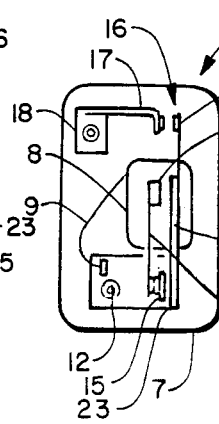
FIG. 2 is a plan view showing the components of the relay of FIG. 1 in a non-energized position.

Throughout the Figures and detailed description, the same reference numerals depict the same or similar part or element.

Referring now specifically to FIGS. 1–4, the combined magnetic/thermal relay 6 of the present invention is shown. A base 7 is provided to support the various components of the relay. The relay includes a coil 8 formed of a plurality of turns of electrical conducting wire 9 such as, for example, copper or alloys thereof, generally used in electromagnet coils. The coil is wound around an inserted spool, constructed of plastic or the like, for example Teflon etc., positioned around a metal core 10 in a conventional manner. The core 10 extends below and above the coil spool 11. The bottom extension of the core 10 is connected to the positive terminal 12. One end of the coil wire 9 is connected to terminal 13 which extends through the base 7. Attached to the upper extension of the metal core 10 is a bimetal strip 14 which forms the rotor of the thermal switch. The stator 15 of the thermal switch is connected to the other end of the wire 9 forming the coil.

The stator 15 of the thermal switch is held in a fixed position by the base 7 and electrically isolated therefrom by insulator 21 and is further isolated from the various other components making up the relay. The rotor 16 of a magnetic switch is generally constructed of a bifurcated ferris metal support portion 23 with a thin sheet of conductive material 25 interconnecting the two portions 23 and connected to terminal 12 and is therefore electrically common to the core 10. The stator 17 of the magnetic switch is connected to terminal 18 which is physically similar to terminals 12 and 13.

When terminal 13 is connected to the negative potential of a source of direct current electrical power and terminal 12 is connected to the positive potential of the same source current flows between terminals 12 and 13. The current flows first through the core 10, through the bimetal strip rotor 14 and stator 15 of the normally closed thermal switch and through the coil 8. Current flowing along this path energizes the coil 8 creating a magnetic field which causes the normally open magnetic switch to change its state to a closed position placing positive potential on terminal 18 for operating a timed external alarm system or time delay interior lamp as hereinafter explained in more detail. The components of the relay are now positioned as shown in FIG. 3.

As current flows through the coil 8 the resistance to that flow produces or generates heat. This heat is transferred through the insulated walls of the spool to the core by conduction. As the core heats this heat is conducted into the bimetal strip. When the bimetal strip is heated to an elevated level the thermal switch bimetal strip rotor 14 is caused to bend away from its contact with the thermal switch stator 15 opening the current path through the coil. The opening of this current path causes the rotor 16 of the magnetic switch to return by internal bias to its normally open state thus removing the source of positive voltage from terminal 18, effectively timing the operation of an external circuit, such as an alarm circuit, interior lamp circuit or the like, as discussed hereinafter in more detail. The components of the relay are now in the position shown in FIG. 4.

As the core heat dissipates the bimetal strip rotor 14 cools and returns to its normal straight or switch closed state reactivating the path of coil current thus causing the components of the relay to again return to their FIG. 3 position. The magnetic and thermal relay components continue to alternately switch between their FIG. 3 and FIG. 4 positions until the positive or negative source is removed from terminals 12 or 13.

Figure 3:
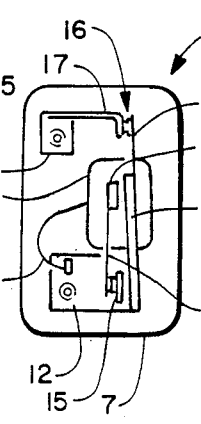
FIG. 3 is a plan view showing the components of the relay of FIG. 1 in an energized state.

The length of time that the relay components are maintained in their FIG. 3 position is determined by the size of the coil wire, the number of turns of the wire, the spool's insulated wall thickness between the core and the coil, the size of the core and the ambient temperature. I have found that with a coil formed of approximately seven hundred turns of lacquered copper wire in the size range of 0.0045 to 0.0075 inches spaced approximately 0.037 inches from the core the relay elements will remain in their FIG. 3 position for approximately three minutes.

Figure 4:
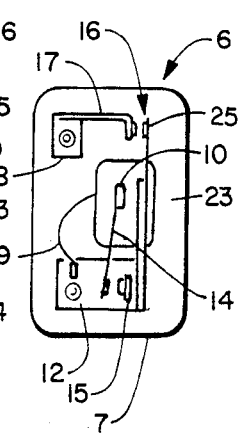
FIG. 4 is a plan view showing the components of the relay of FIG. 1 in a time lapsed state.

The off time, FIG. 4 component positions, is determined by the type of metals employed to form the bimetal strip. The off time is found to be approximately the same as the on time.

Obviously the on and off times can be varied as required by selection of the various components, spacing, etc., as hereinbefore mentioned.

Figure 5:
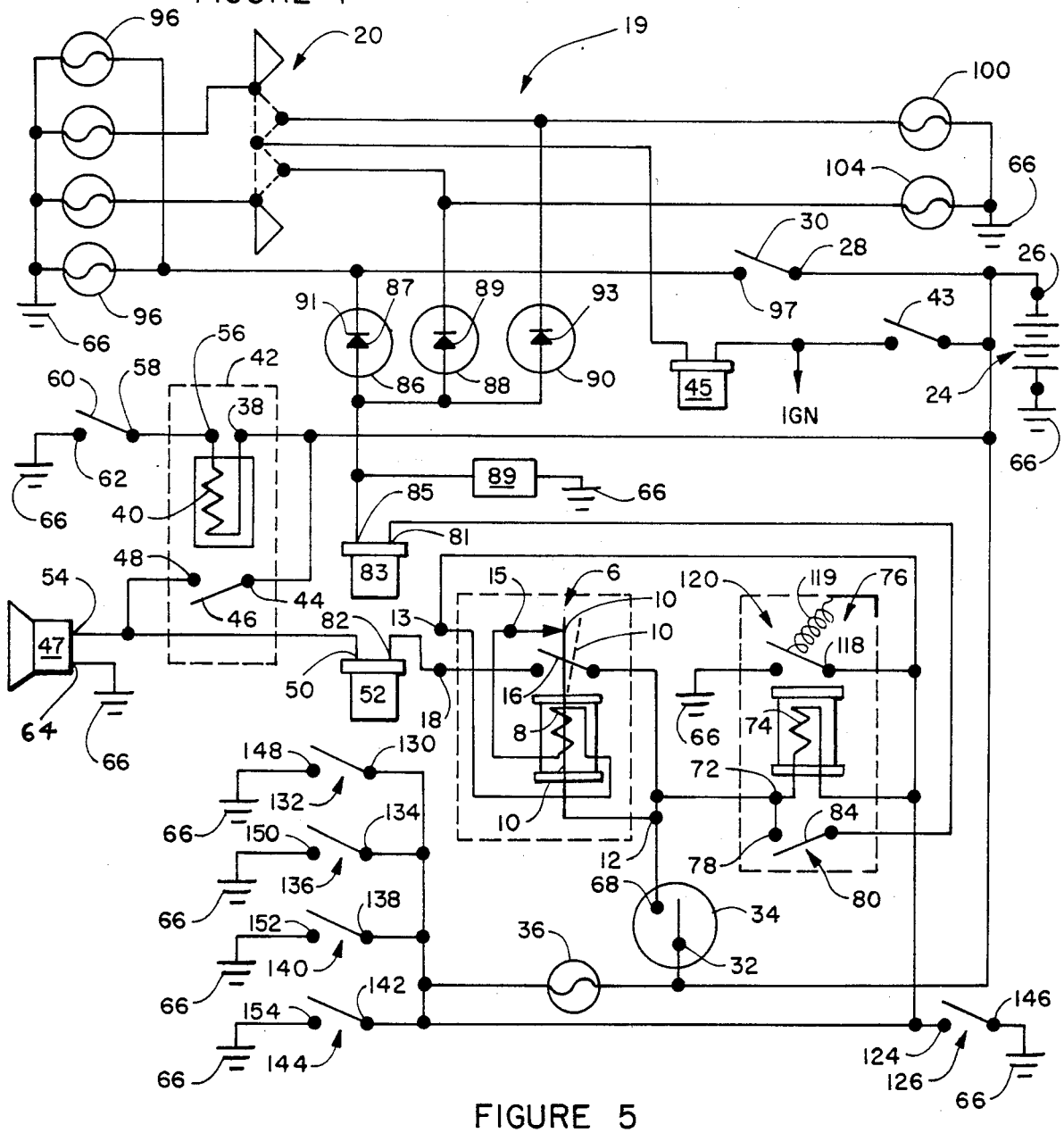
FIG. 5 is a schematic wiring diagram employing a single relay as a combined alarm system activating and timing means.

Referring now to FIG. 5. The relay 6 of the invention is shown employed for use as a timer for an alarm system for an automotive vehicle.

The reference numeral 19 generally designates the circuit as a vehicle alarm system. The alarm system is shown connected to the conventional rear brake lamps, turn signal and horn circuit of an automotive vehicle having turn signal and hazard warning circuits generally shown as 20.

A conventional vehicle storage battery 24 has its positive terminal 26 connected in parallel to terminal 28 of a conventional foot brake pedal operated brake lamp switch 30; to terminal 32 of an arming or alarm system's activation switch 34; to the filament of the vehicle interior courtesy lamp 36; to terminal 38 of coil 40 of the horn relay 42; to the ignition switch 43 and to terminal 44 of horn relay activated switch 46.

Terminal 48 of horn relay activated switch 46 is connected to terminal 50 of flasher element 52 and the vehicle horn terminal 54. Terminal 56 of coil 40 of horn relay 42 is connected to terminal 58 of a conventional horn press to activate switch 60 generally located on the vehicle steering wheel not shown. Terminal 62 of switch 60 and terminal 64 of the vehicle horn are connected to battery 24 negative terminal 66.

Terminal 68 of activation switch 34 is connected to terminal 12 of relay 6 which connects to the metal core 10, to the rotor 16 of the magnetic switch; to terminal 72 of coil 74 of relay 76 and to the stator 78 of switch 80.

Terminal 18 of the relay 6 is connected to terminal 82 of flasher element 52. The rotor 84 of switch 80 is connected to terminal 81 of a second conventional flasher element 83. Terminal 85 of flasher element 83 is connected to the anodes 87, 89 and 93 respectfully of diodes 86, 88 and 90 and to an interior buzzer or chime 89. The diodes may be of like or of different types. The only requirement of the diodes is that battery current flow with negligible resistance in the direction from anode to cathode and have a maximum resistance to current flow in the opposite direction. The cathode 91 of diode 86 is connected to the filaments of the brake lamps 96 and to terminal 97 of brake switch 30. The opposite ends of the brake lamp filaments are connected to negative terminal 66 of battery 24. The cathode 89 of diode 88 is connected to the filament of a vehicle front turn signal lamp 104. Likewise cathode 93 of diode 90 is connected to a filament of a second turn signal lamp 100, one being on each side of the vehicle. The opposite end of the filaments of the front turn signal lamps 100 and 104 are connected to the negative terminal 66 of battery 24. It should be understood that the turn signal lamps 100 and 104 are connected to the turn signal switch 20 and hazard flasher element 45 in a conventional manner.

Terminal 12 of the relay 6 is connected to terminal 68 of switch 34, terminal 78 of switch 80 and to 72 of coil 74 of relay 76. Terminal 13 of relay 6 is connected to terminal 118 of switch 120, to terminal 124 of trunk access switch 126, to the filament of the courtesy lamp 36, to terminal 130 of door access switch 132, terminal 134 of hood access switch 136, terminal 138 of fuel fill access door switch 140 and terminal 142 of door access switch 144. Terminals 146, 148, 150, 152, and 154 of their associated access switches are connected to terminal 66 of battery 24.

The switch 34 is activated by switching to the position that connects terminal 32 to terminal 68. When this is done, the alarm system is activated. Nothing will occur unless one of the normally open switches 126, 132, 136, 140 or 144 is closed by the opening or removal of an associated vehicle access panel. When at least one of these switches is closed, current flows through the coil 8 of relay 6 closing the magnetic activated switch.

With at least one of the access panel switches closed, current also flows through coil 74 of relay 76 causing switches 120 and 80 associated therewith to close providing an additional circuit ground to the alarm system and supplying current to the anodes of diodes 86, 88 and 90 and the interior buzzer or chime 89. With switch 120 now closed, if the original access switch or switches which initially activated relay 76 are again opened by closure of the offending vehicle access panel or panels, the lights 96 and 104 will continue to flash, the interior buzzer or chime and the horn 47 honk intermittently.

The system can only be de-activated by the switch 34 being placed in the off position opening the connector between terminals 32 and 68, as shown in FIG. 5.

The switch 34 may be positioned in any convenient location on the exterior of the vehicle. Suggested locations, only by way of example and not by way of limitation, may be in the vehicle door or associated with the fuel fill access door lock.

In the event the vehicle alarm system is activated and left on for a long period of time, a spring 119 associated with the relay switch 120 is calibrated so that it will bias the switch open against the magnetism created by the coil 74 of relay 76 when the battery reaches a predetermined voltage level. The predetermined voltage level would be a level at which the battery will still have sufficient current to start the vehicle.

Current will flow through the horn 47 causing it to intermittently honk. Current through diode 86 flashes the rear vehicle brake lamps 96, current through diode 88 flashes the right front turn signal lamp 100 and diode 90 flashes the left front turn signal lamp 104. When the flasher circuit is momentarily open no current will flow through the diodes. The operation of the thermal switch portion of relay 6, as hereinbefore described, controls current flow through the flasher elements 52 and 83, the series diodes 86, 88 and 90, and the interor light or buzzer chime 89.

Figure 6:
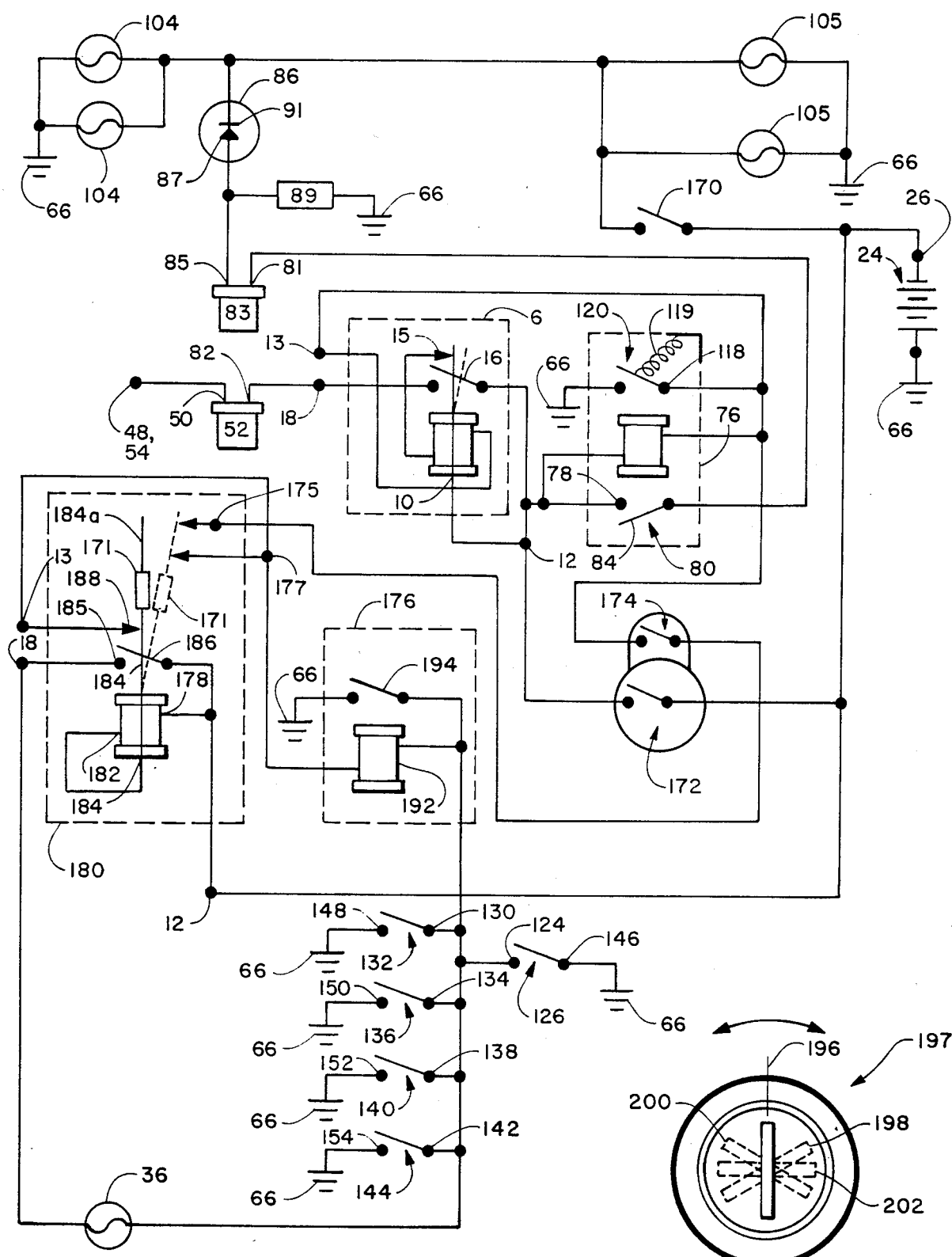
FIG. 6 is a schematic wiring diagram employing a pair of relays for a combined alarm system activating and means, and a vehicle interior lamp and alarm activation delay.

Referring now specifically to FIG. 6, the circuit utilizes one combined magnetic/thermal relay 6 hereinbefore described in detail and a second combined magnetic/thermal relay 180 substantially the same as relay 6 except for an added pair of contacts 175 and 177 engaging 184a, which is electrically isolated from 184 by spacer 171. A parking lamp switch 170 has been added and switch 34 has been replaced by the anti-theft portion of an ignition switch 172. Parking lamps 105 are operated manually by switch 170 or as part of the alarm system when current flows through diode 86. The circuit of FIG. 6 differs from the circuit of FIG. 5 in that the connection from the stator 15 of combined magnetic thermal relay 6 does not directly connect to the plurality of access switches which provided the circuit ground in FIG. 5 when in a closed state.

The connection from connection 13 of the relay 6 in FIG. 6 is connected to one side of a key operated switch 174 which is normally open, when the ignition key is removed therefrom in the off position to contact 175 of relay 180, to the high side of switch 120 and to the coil of relay 76. The switch 172 is in a closed state when in the anti-theft position. The key (not shown) is removable in the anti-theft position in addition to the "off" position. The opposite side of switch 174 is conencted to the normally open contact 175 of combined magnetic/thermal relay 180. Normally open contact 177 of relay 180 is connected to one side of the coil of relay 176. The positive terminal 26 of battery 24 is connected to terminal 178 (one end of the relay coil) of the second combined magnetic/thermal relay 180. Terminal 182 (the opposite end of the coil of relay 180) is connected to the thermal rotor 184 of relay 180. One terminal of the magnetic switch 186 of relay 180 is connected to terminal 26 of battery 24. The opposite terminal 185 of switch 186 is connected to the filament of interior lamp 36. The opposite side of the filament of interior lamp 36 is connected in parallel to access switches 126, 132, 136, 140, and 144 the opposite side of which are connected to terminal 66 of battery 24.

The thermal switch portion of relay 180 includes stator connections 188, and stator connections 175 and 177 electrically isolated therefrom as hereinbefore discussed. Stator 188 is connected to one side of the energizing coil of relay 192. The opposite end of the energizing coil of relay 192 is connected in parallel to normally open switch 194, and to the high side of access switches 126, 132, 136, 140 and 144.

Relay 180 is constructed in a manner hereinbefore discussed to provide a thermal switching sequence approximately every thirty seconds when activated.

Figure 7:
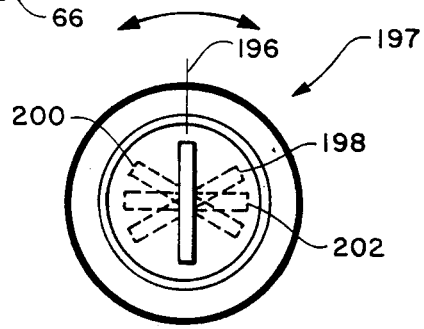
FIG. 7 is a front showing of the ignition switch lock or door switch lock used in the invention.

The key lock switch 197, which includes switches 172 and 174, operates mechanically as shown in FIG. 7. The alarm activation portion of the switch 197 has two positions, namely, the locked position 196, and the anti-theft alarm activated position 202 which closes switch 172. When switch 197 is employed in combination with an ignition switch two additional positions are employed, namely, ignition with reciprocating start position 198 and accessary position 200. The lock mechanism of the key lock switch 197 is designed so that the key (not shown) can only be inserted and removed in the off position 196 and the anti-theft alarm activated position 202. Further the lock mechanism is designed so that it can be turned between locked, unlocked and neutral off positions, in a conventional known manner, and turned between the accessory and anti-theft activated position from neutral against an internal spring and then turning the key similarly as disclosed in my U.S. Pat. Nos. 2,519,758 and 2,520,363 directed to a combined ignition and lock switch. The difference between the switch 197 of this invention and my prior art patents last mentioned is that when the switch is in the accessory position shown as 200, in FIG. 7, the key cylinder must be "pushed inward" and then rotated to the anti-theft position, whereupon the activating key can be removed closing switch 174. Tests have shown that pushing inwardly on the ignition switch for vehicle starting is safer in respect to children playing with keys left inadvertently in a vehicle than the rotary type.

The FIG. 6 circuit operates in the following manner. When the key is removed from the switch while in the anti-theft position switch 172 and switch 174 are in a closed condition and when an access switch, associated with an access panel, is closed the relay 180 is energized initially preventing the alarm operation and illuminating the interior lamp 36 for approximately thirty seconds. This allows the vehicle operator time to enter or to exit the vehicle and open the closed access switch without activating the alarm circuit. It should be understood that when switch 172 is left in a closed position and the key is removed from the switch closing switch 174 the alarm will be in an activated state, as hereinbefore described, and after an electrical ground is established by an access panel opening the interior lamp 36 will illuminate and after the approximate thirty second delay period and the ground is not removed prior to the length of that delay the alarm circuit will be activated and will lock on and the interior lamp 36 will be illumination according to the thermal cycle of combined magnetic/thermal relay 180. If, however, the access panel related switch is opened, this delayed inter lamp 36 illumination will cause after a predetermined time period, approximately 30 seconds, and will not further illuminate until the opening of a subsequent access panel and resulting switch closure.

It should be understood that normal operation of the parking, brake, turn signal and hazard lamps will not activate the alarm system. It should be further understood that the horn will intermittently honk in conjunction with the intermittent audio alarm inside the vehicle and the parking or directional lamps for a pre-determined time (approximately 3 minutes, for example) then the horn will cease honking for a like time period and in the interim, only the audio alarm and flashing lights remain operable. This feature reduces power drain and annoyance to people in the immediate vacinity. Also, the anti-theft ignition switch lock is adaptable to the door rather than the ignition lock. The lock functions the same except one switch for the door lock is incorporated instead of the two switches in the ignition switch lock. It should be further understood that although the Figures are directed to vehicles having negative ground, it could obviously be connected to vehicles reversed polarity by reversing the battery connections.

It will be apparent to those skilled in this art that many modifications and variations may be effected without departing from the spirit and scope of the novel concepts of the present invention.

What is claimed is:
1. Combined magnetic and thermal relay comprising:
   a magnetic core;
   a coil of electrical conductive wire wound around said core;

a normally open magnetic switch having a stator and a rotor;

a normally closed thermal switch having a bimetal rotor and a stator, said bimetal rotor attached to said core; and a source of electrical current having positive and negative potentials;

one end of said magnetic core and the rotor of said magnetic switch are connected to a first connection, one end of said coil is connected to a second connection and the other end of said coil is connected to the stator of said thermal switch and the stator of said magnetic switch is connected to a third connection whereby when said first connection is connected to said positive potential and said second connection is connected to said negative potential current flows through said thermal activated switch through the coil magnetizing said core which closes said magnetic switch, the heat generated by the coil resistance to the current flow therethrough heats said core and said bimetal rotor and when temperature of said bimetal rotor is elevated to a sufficient level said thermal switch is caused to open by the bending of said bimetal rotor, current through said coil is terminated and said magnetic switch returns to its normal open state removing the positive potential from the third connection, the switching sequence repeats as the bimetal rotor is cooled and reheated.

2. The invention as defined in claim 1 wherein sufficient heat is generated by said coil to open said thermal switch in approximately three minutes.

3. The invention as defined in claim 1 wherein said coil has approximately seven hundred turns of thirty-six gauge wire.

4. The invention as defined in claim 1 wherein a base is provided and said connections extend through said base.

5. The invention as defined in claim 1 wherein the delay in operation of said thermal relay depends on the size and number of turns of wire forming said coil.

6. The invention as defined in claim 1 wherein the thermal portion of said relay has three stators and the rotor comprises two longitudinal electrically insulated segments and the thermal operation of said relay causes first one segment of said bimetal rotor to engage a single stator and second the other segment to engage the other pair of stators.

7. the invention as defined in claim 1 wherein said positive and negative potentials are reversed.

8. a vehicle alarm circuit comprising:

a power source;

a first relay having a normally open single throw magnetic switch and a normally closed single pole, single throw thermal activated switch;

a second relay having a normally open single pole, single throw magnetic switch and a thermal operated switch having a single pole, single throw normally closed portion and a separate normally open double pole single throw switch;

a first solenoid having a pair of normally open single pole, single throw swtiches associated therewith;

a second solenoid having a normally open single pole, single throw switch associated therewith;

a plurality of parallel mechanically operated, normally open, single throw, single pole switches;

a plurality of turn signal lamps;

a vehicle interior lamp;

a key switch having an anti-theft position and a normally open key insertable operated switch;

a pair of flasher elements; and an audio alarm;

said power source, said first and second relays, said first and second solenoids, said plurality of parallel switches, said turn signal lamps, said vehicle interior lamp, said key operated switch, a flasher element and said audio alarm are electrically inter-connected so that when the key is removed from said switch, and said switch is in said anti-theft position and at least one of said parallel mechanically operated switches is positioned from a normally open state to a closed state, the normally open switch of said second solenoid is caused to close, the normally closed magnetic switch of said second relay is caused to close and said interior lamp illuminates, if after a predetermined time said at least one of said parallel switches remains in a closed state, said audio alarm intermittently sounds, said turn signal lamps and interior lamps illuminate, after the predetermined time span, the opening of said at least one parallel switch will not terminate said audio alarm sounding of said turn signal lamps intermittent illumination.

9. The invention as defined in claim 8 further comprising parking lamps interconnected to operate in the same manner as said turn signal lamps when the vehicle alarm is energized.

10. The invention as defined in claim 8 wherein the rotor of said thermal switch of said second relay alternates between poles approximately every thirty seconds due to the heat generated by current flow through said second relay.

11. The invention as defined in claim 8 wherein the rotor of said thermal switch of said first relay changes state approximately every three minutes due to the heat generated by current flow through said first relay.

12. The invention as defined in claim 8 wherein said key operated switch must be pushed inwardly to operate said anti-theft position.

13. The invention as defined in claim 8 wherein said thermal activated switch of said first relay extinguishes said interior lamp approximately 30 seconds after said at least one parallel mechanically operated switches is returned to an open state.

14. The invention as defined in claim 8 wherein said key operated switch is incorporated in a vehicle ignition switch.

15. A vehicle alarm circuit comprising:

a power source;

a relay having a normally open single throw magnetic switch;

a combined thermal and magnetic relay having an activating coil wound around a central core, a normally open magnetic switch and a normally closed thermal operational switch;

a plurality of parallel, mechanically operated, normally open, single throw, single pole switches;

a vehicle interior lamp;

an activating switch having an open and closed position;

a flasher element; and an audio alarm;

said power source, said relay, the switches of said combined thermal and magnet relay, said plurality of mechanical magnetic parallel switches, said vehicle interior lamp, said activating switch, said flasher element and said audio alarm are electrically inter-connected so that when said activating switch is in a closed position and at least one of said parallel mechanically operated switches is positioned from a normally open state to a closed state, the normally open magnetic switch of said combined thermal and magnetic relay is caused to close, said interior lamp illuminates, said audio alarm intermittently sounds until the heat from said coil causes said thermal switch of said combined thermal and magnetic relay to open after a predetermined time delay.

16. The invention as defined in claim 15 wherein said activating switch is key operated and must be pushed inward to operate from an open to a closed position.

* * * * *